United States Patent [19]

Kanai et al.

[11] Patent Number: 5,570,260
[45] Date of Patent: Oct. 29, 1996

[54] OVERVOLTAGE PROTECTION CIRCUIT

[75] Inventors: Takeo Kanai, Saitama-Ken; Kiyoshi Kusunoki, Kanagawa-Ken, both of Japan

[73] Assignee: Kabushiki Kaisha Toshiba, Kawasaki, Japan

[21] Appl. No.: 160,847

[22] Filed: Dec. 3, 1993

[30] Foreign Application Priority Data

Apr. 20, 1993 [JP] Japan .................................. 5-092681

[51] Int. Cl.⁶ ..................................................... H02H 9/00
[52] U.S. Cl. ............................... 361/91; 361/56; 361/111; 361/118
[58] Field of Search ..................... 361/56, 18, 91, 361/118, 58, 111; 307/642; 323/211, 208, 81

[56] References Cited

U.S. PATENT DOCUMENTS

| | | | |
|---|---|---|---|
| 4,051,545 | 9/1977 | Kloss | 361/56 |
| 4,571,535 | 2/1986 | Gyugyi | 361/56 |
| 4,703,411 | 10/1987 | Umbricht | 307/642 |

FOREIGN PATENT DOCUMENTS

| | | | |
|---|---|---|---|
| 4-21319 | 1/1992 | Japan | H02H 9/04 |
| 5-3667 | 1/1993 | Japan | H02M 1/00 |

OTHER PUBLICATIONS

Patent Abstracts of Japan, vol. 12, No. 162 (E-609), May 17, 1988, JP 62272861, Nov. 27, 1987.

Primary Examiner—Jeffrey A. Gaffin
Assistant Examiner—Stephen W. Jackson
Attorney, Agent, or Firm—Oblon, Spivak, McClelland, Maier & Neustadt, P.C.

[57] ABSTRACT

An overvoltage protection circuit including a plurality of series connected thyristors having an overvoltage protection function and a plurality of impedance circuits. Each of the impedance circuits is connected in parallel with one of the thyristors, respectively. The impedance circuits include at least a first impedance circuit having a first impedance value and a second impedance circuit having a second impedance value which is different from the first impedance value.

13 Claims, 6 Drawing Sheets

OVERVOLTAGE PROTECTION CIRCUIT

BACKGROUND OF THE INVENTION

1. Field of the Invention

This invention relates to an overvoltage protection circuit, and more particularly to an overvoltage protection circuit using thyristors with an overvoltage protection function, an overvoltage protection equipment constructed with the same and a power converter also constructed with the same.

2. Description of the Related Art

FIG. 9 is a layout diagram showing an example of a conventional overvoltage protection equipment using thyristors equipped with an overvoltage protection function (hereinbelow called VBO-free thyristors).

In this FIG., 1 is an induction montor, 2 is a power converter that supplies low frequency AC power to the secondary circuit of induction motor 1, and 3 is an overvoltage protection equipment wherein three overvoltage protection circuits 4 constituted by connecting in series a plurality of antiparallel connection circuits consisting of VBO-free thyristors 11 are connected between each phase of power converter 2. When overvoltage is generated in the secondary circuit of induction motor 1 by shut-down etc of the primary side of induction motor 1, the secondary circuit of induction motor 1 is short-circuited to protect induction motor 1 from overvoltage.

FIG. 10 is a specific layout diagram of the conventional overvoltage protection circuit 4 shown in FIG. 9. In this layout, a plurality of antiparallel connection circuits consisting of VBO-free thyristors 11 connected in antiparallel are connected in series; snubber circuits consisting of series circuits of snubber capacitor 12 and snubber resistor 13 are connected in parallel with the respective antiparallel connection circuits; and voltage grading resistors 14 are respectively connected therewith in parallel.

A VBO-free thyristor 11 is a device which, when a predetermined prescribed voltage is applied, can perform turn-on even without a gate signal being applied. Snubber capacitors 12, snubber resistors 13 and voltage grading resistors 14 are provided with the purpose of ensuring uniform voltage sharing between the VBO-free thyristors 11 which are connected in series; their values are the same for each circuit. If we represent the voltage at which firing of VBO-free thyristor 11 takes place without application of a gate signal by VVBO, the turn-on voltage in the entire series circuit constituted by n VBO-free thyristors 11 is n.VVBO.

In the overvoltage protection equipment 3 shown in FIG. 9, when the overvoltage protection equipment 3 is constructed with three overvoltage protection circuits 4 constituted by connecting in series n antiparallel circuits obtained by antiparallel connection of VBO-free thyristors 11, when the voltage applied to both ends of the overvoltage protection circuit 4 reaches n.VVBO, it is turned ON and electrical equipment such as inductor motor 1 and power converter 2 connected to the overvoltage protection equipment 3 is thereby protected from overvoltage.

However, generally it must be ensured that the overvoltage protection equipment is not turned ON for the voltage that is regularly generated by the electrical equipment, which is connected in parallel with the overvoltage protection equipment and is to be protected from overvoltage. Since this regularly generated voltage also includes, for example, surge voltage generated by power converter shown in FIG. 9, a value higher than the rated voltage of the electrical equipment that is to be protected from overvoltage must be selected for the operating voltage of the overvoltage protection equipment 3. In other words, a number of VBO-free thyristor 11 antiparallel circuits to be connected in series must be selected such that the voltage at which the overvoltage protection equipment 3 turns ON is higher than the regularly generated voltage. For example, if the regularly generated voltage is more than n.VVBO and less than (n +0.5).VVBO, the number of VBO-free thyristor 11 antiparallel circuits connected in series must be (n +1). In this case therefore the overvoltage protection equipment 3 does not turn ON unless the voltage applied to the electrical equipment or the voltage generated in the electrical equipment to be protected from overvoltage reaches (n +1).VVBO. Thus, the electrical equipment that is to be protected from overvoltage must be capable of withstanding this (n +1).VVBO voltage. In the case where the electrical equipment is a power converter, it must have a higher level of insulation and more number of series-connected semiconductor devices and other circuit elements than the level and the number determined by the normal voltage.

For example, if VVBO is 6 kV and the regularly generated voltage is 13 kV, the number of series-connected VBO-free thyristor 11 antiparallel circuits to be connected in series is 3, giving an overvoltage protection equipment turn-on voltage of 18 kV.

Consequently, although the ideal protection voltage of the electrical equipment that is to be protected from overvoltage can be set about 14 kV to 15 kV, the turn-on voltage of the overvoltage protection equipment is decided to be 18 kV, so the electrical equipment itself that is to be protected from overvoltage must be such in terms of insulation and construction as to be capable of withstanding 18 kV.

The turn-on voltage of the conventional overvoltage protection equipment changes in stepwise manner. If therefore harmonization could not be achieved between the operating voltage of the overvoltage protection equipment and the voltage generated by the electrical equipment to be protected from overvoltage or the voltage applied to the electrical equipment, size and cost of the electrical equipment were increased due to the resulting requirement for further insulation.

The overvoltage protection circuit 4 shown in FIG. 10 has the function of providing protection for both polarities of the voltage generated by the electrical equipment to be protected from overvoltage or voltage applied to the electrical equipment. However, in cases where the voltage generated by the electrical equipment to be protected from overvoltage or voltage applied to the electrical equipment is a polarity in only one direction, instead of the VBO-free thyristors 11 needing to be antiparallel-connected, series connection would suffice. In such cases also, as described above, if harmonization cannot be obtained between the voltage generated in the electrical equipment to be protected from overvoltage or voltage applied to the electrical equipment and the operating voltage of the overvoltage protection equipment, the electrical equipment to be protected from overvoltage has to be unduly large or expensive due to the requirement for increased insulation.

SUMMARY OF THE INVENTION

Accordingly, one object of this invention is to provide an overvoltage protection circuit which can finely adjust the overvoltage protection actuation level, can prevent the electrical equipment to be protected from overvoltage from increasing its insulation and the number of its construction devices and elements and can thereby reduce the size and production cost of the electrical equipment.

Another object of this invention is to provide an overvoltage protection equipment which can finely adjust the overvoltage protection actuation level, can prevent the electrical equipment to be protected from overvoltage from increasing its insulation and the number of its construction devices and elements and can thereby reduce the size and production cost of the electrical equipment.

Still another object of this invention is to provide a power converter wherein its arm has an overvoltage protection function which can dispense with a separate overvoltage protection equipment thereof, can finely adjust the overvoltage protection actuation level, and can thereby reduce its size and production cost.

A further object of this invention is to provide a static vat compensator wherein its arm has an overvoltage protection function which can dispense with a separate overvoltage protection equipment thereof, can finely adjust the overvoltage protection actuation level, and can thereby reduce its size and production cost.

These and other objects of this invention can be achieved by providing an overvoltage protection circuit including a plurality of series connected thyristors having an overvoltage protection function and a plurality of impedance circuits. Each of the impedance circuits is connected in parallel with one of the thyristors, respectively. The impedance circuits include at least a first impedance circuit having a first impedance value and a second impedance circuit having a second impedance value which is different from the first impedance value.

According to one aspect of this invention, there is provided an overvoltage protection equipment for protecting an electric equipment from overvoltage. The overvoltage protection equipment includes three overvoltage protection circuits connected between respective two phases of the electric equipment. Each of the three overvoltage protection circuits includes a plurality of series connected thyristors having an overvoltage protection function and a plurality of impedance circuits, each of which is connected in parallel with one of the thyristors, respectively. The impedance circuits include at least a first impedance circuit having a first impedance value and a second impedance circuit having a second impedance value which is different from the first impedance value.

According to another aspect of this invention, there is provided an overvoltage protection equipment for protecting a synchronous motor and a rectifier for supplying DC power to a field circuit of the synchronous motor from overvoltage. The overvoltage protection equipment includes an overvoltage protection circuit connected to the synchronous motor and the rectifier. The overvoltage protection circuit includes a plurality of series connected thyristors having an overvoltage protection function and a plurality of impedance circuits, each of which is connected in parallel with one of the thyristors, respectively. The impedance circuits include at least a first impedance circuit having a first impedance value and a second impedance circuit having a second impedance value which is different from the first impedance value.

According to still another aspect of this invention, there is provided a power converter including a plurality of bridge connected arm circuits. Each of the arm circuits includes a series circuit of a reactor and an overvoltage protection circuit. The overvoltage protection circuit includes a plurality of series connected thyristors having an overvoltage protection function and a plurality of impedance circuits, each of which is connected in parallel with one of the thyristors, respectively. The impedance circuits include at least a first impedance circuit having a first impedance value and a second impedance circuit having a second impedance value which is different from the first impedance value.

According to a further aspect of this invention, there is provided a static vat compensator including delta connected three arm circuits connected between respective two phases of a power system. Each of the arm circuits includes a series circuit of a reactor and an overvoltage protection circuit. The overvoltage protection circuit includes a plurality of series connected thyristors having an overvoltage protection function and a plurality of impedance circuits, each of which is connected in parallel with one of the thyristors, respectively. The impedance circuits include at least a first impedance circuit having a first impedance value and a second impedance circuit having a second impedance value which is different from the first impedance value.

For example, we assume that the impedance circuits respectively connected in parallel with the n thyristors equipped with overvoltage protection function consist of two types of impedance circuit of impedance values Z1 in one case and Z2 in the other case (where Z1>Z2). In this way, by making the impedance values of the impedance circuits respectively connected in parallel with the n thyristors equipped with overvoltage protection function different, the turn-on voltage of the overvoltage protection circuit can be changed in the range lower than n.VVBO.

BRIEF DESCRIPTION OF THE DRAWINGS

A mope complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
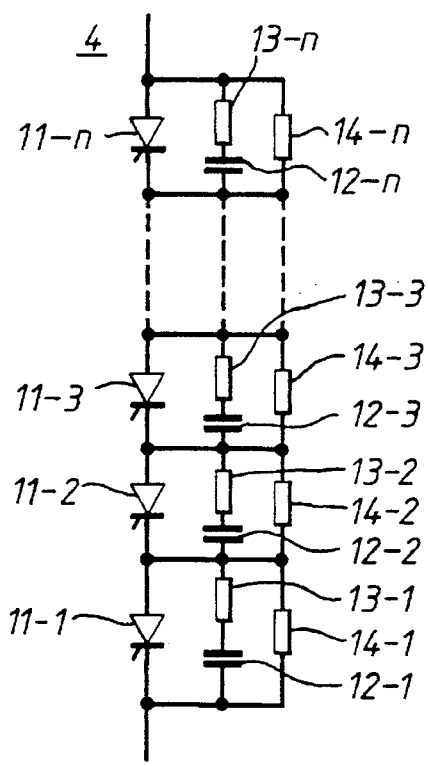
FIG. 1 is a circuit diagram showing an overvoltage protection circuit according to a first embodiment of this invention.

Referring now to the drawings, wherein like reference numerals designate identical or corresponding parts throughout the several views, the embodiments of this invention will be described below.

FIG. 1 is a circuit diagram of an overvoltage protection circuit according to a first embodiment of this invention that protects from overvoltage of unidirectional polarity. In this FIG., 11-1, 11-2, 11-3 ... 11-n are VBO-free thyristors, 12-1, 12-2, 12-3 ... 12-n are snubber capacitors, 13-1, 13-2, 13-3 ... 13-n are snubber resistors respectively connected in series with each of these snubber capacitors 12-1, 12-2, 12-3 ... 12-n, and 14-1, 14-2, 14-3 ... 14-n are voltage grading resistors respectively connected in parallel with VBO-free thyristors 11-1, 11-2, 11-3 ... 11-n. Let the combined impedance of snubber capacitor 12-1, snubber resistor 13-1, and voltage grading resistor 14-1 be Z1, the combined impedance of snubber capacitor 12-2, snubber resistor 13-2, and voltage grading resistor 14-2 be Z2, the combined impedance of snubber capacitor 12-3, snubber resistor 13-3, and voltage grading resistor 14-3 be Z3, and the combined impedance of snubber capacitor 12-n, snubber resistor 13-n and voltage grading resistor 14-n be Zn. In this invention, different values are selected for all or some of Z1, Z2, Z3 .. Zn. For example, if n=3, Z1:Z2:Z3=1.5:1:1 or Z1:Z2:Z3= 1.5:1.2:1 may be selected. To facilitate understanding, an overvoltage protection circuit consisting of three series connections is described below (n=3). If, as described above, Z1:Z2:Z3=1.5:1:1 is selected, the voltage V1 applied to the VBO-free thyristor 11-1 becomes larger than the voltage V2 applied to VBO-free thyristor 11-2 and voltage V3 applied to VBO-free thyristor 11-3, and the ratio V1:V2:V3=1.5:1:1. If the turn-on voltage of each of VBO-free thyristors 11-1, 11-2 and 11-3 itself is VVBO, when VBO-free thyristor 11-1, is ON, the voltage applied to the series circuits of VBO-free thyristors 11-1, 11-2 and 11-3 is [1+(1/1.5)+(1/1.5)].VVBO=2.33 VVBO. Since this voltage is applied uniformly to VBO-free thyristors 11-2, 11-3, that is, (2.3/2) VVBO=1.15 VVBO is respectively applied to them, and VBO-free thyristors 11-2 and 11-3 are also successively turned ON. The overvoltage protection circuit is therefore turned ON at 2.33 VVBO.

Also for example if the impedance ratio is selected such that Z1:Z2:Z3=1.2:1:1, the turn-on voltage of the overvoltage protection circuit can be made [1+(1/1.2)+(1/1.2)] .VVBO=2.66 VVBO. Thus, the voltage at which the overvoltage protection circuit turns ON can be freely varied by suitably selecting the impedance ratio, not limited in stepwise manner.

According to this embodiment, the electrical equipment to be protected from overvoltage can be prevented from increasing its insulation and the number of its construction devices and elements. Thereby, the electrical equipment can be reduced in its size and production cost.

Figure 2:
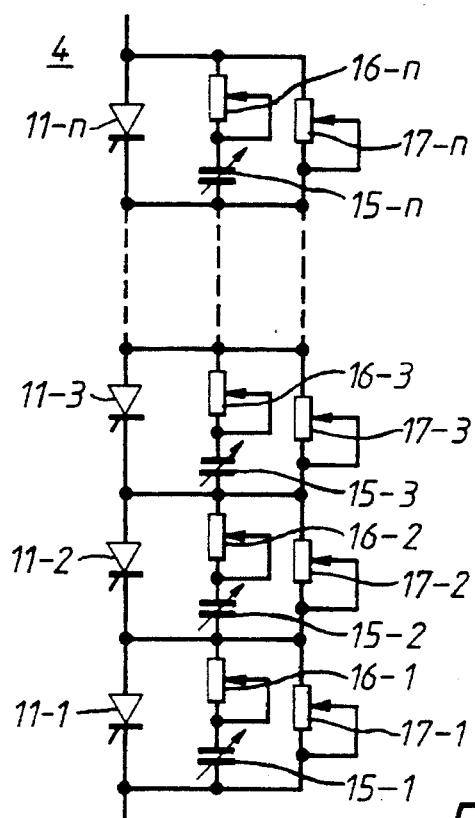
FIG. 2 is a circuit diagram showing an overvoltage protection circuit according to a second embodiment of this invention.

In the first embodiment, snubber capacitors 12-1, 12-2, 12-3, ... 12-n, snubber resistors 13-1, 13-2, 13-3 ... 13-n and voltage grading resistors 14-1, 14-2, 14-3 ... 14-n were fixed values, but, as shown in FIG. 2, by making snubber capacitor 15-1, 15-2, 15-3 ... 15-n variable-capacitance capacitors and by making snubber resistors 16-1, 16-2, 16-3 ... 16-n and voltage grading resistors 17-1, 17-2, 17-3 ... 17-n variable resistors, the turn-on voltage of the overvoltage protection circuit can be even more finely adjusted.

Figure 3:
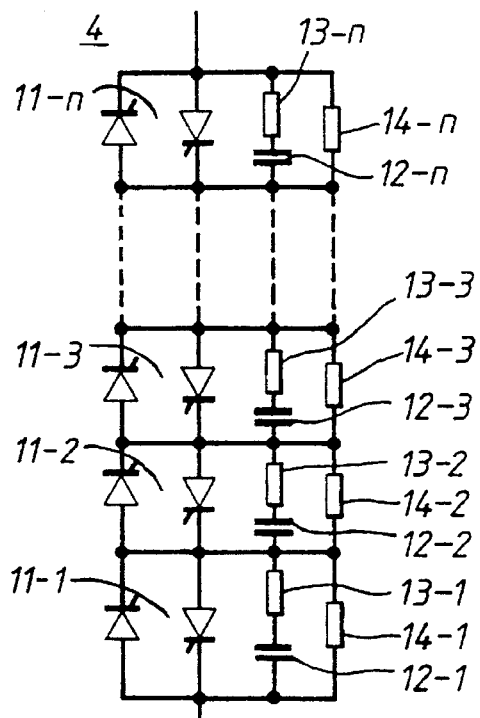
FIG. 3 is a circuit diagram showing an overvoltage protection circuit according to a third embodiment of this invention.
Figure 4:
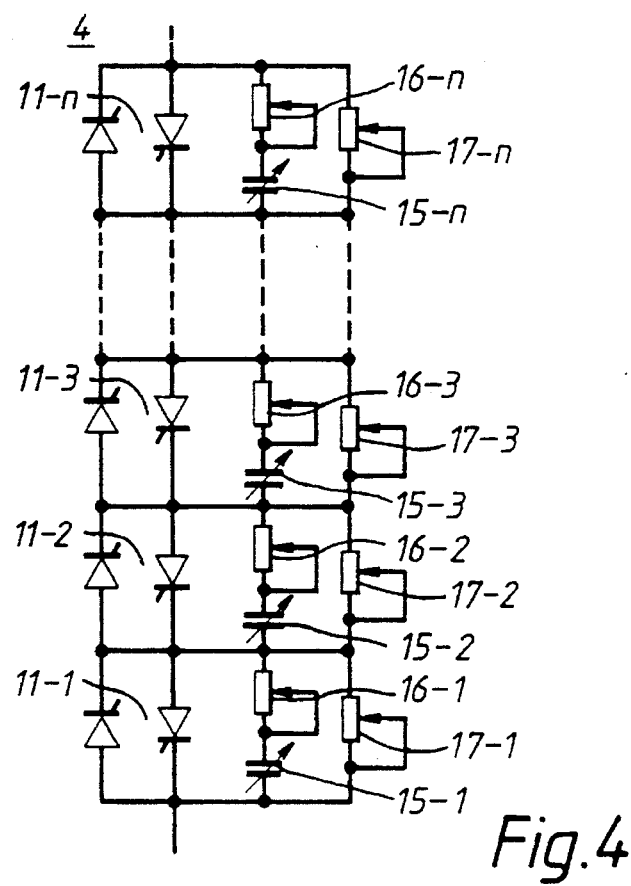
FIG. 4 is a circuit diagram showing an overvoltage protection circuit according to a fourth embodiment of this invention.

Furthermore, if, in FIG. 1 and FIG. 2, an anti-parallel connected layout is adopted for VBO-free thyristors 11-1, 11-2, 11-3 ... 11-n, as shown in FIG. 3 and FIG. 4, an overvoltage protection circuit that protects from overvoltage of bidirectional polarity can be produced.

When the voltage that is generated by the electrical equipment to be protected from overvoltage or the voltage applied to the electrical equipment is overvoltage of unidirectional polarity, the overvoltage protection equipment constructed with the overvoltage protection circuit of FIG. 1 or FIG. 2 may be connected in parallel with the electrical equipment that is to be protected from overvoltage. When the voltage generated by the electrical equipment that is to be protected from overvoltage or the voltage applied to the electrical equipment is overvoltage of bidirectional polarity, an overvoltage protection equipment constructed with the overvoltage protection circuit of FIG. 3 or FIG. 4 may be employed.

Figure 5:
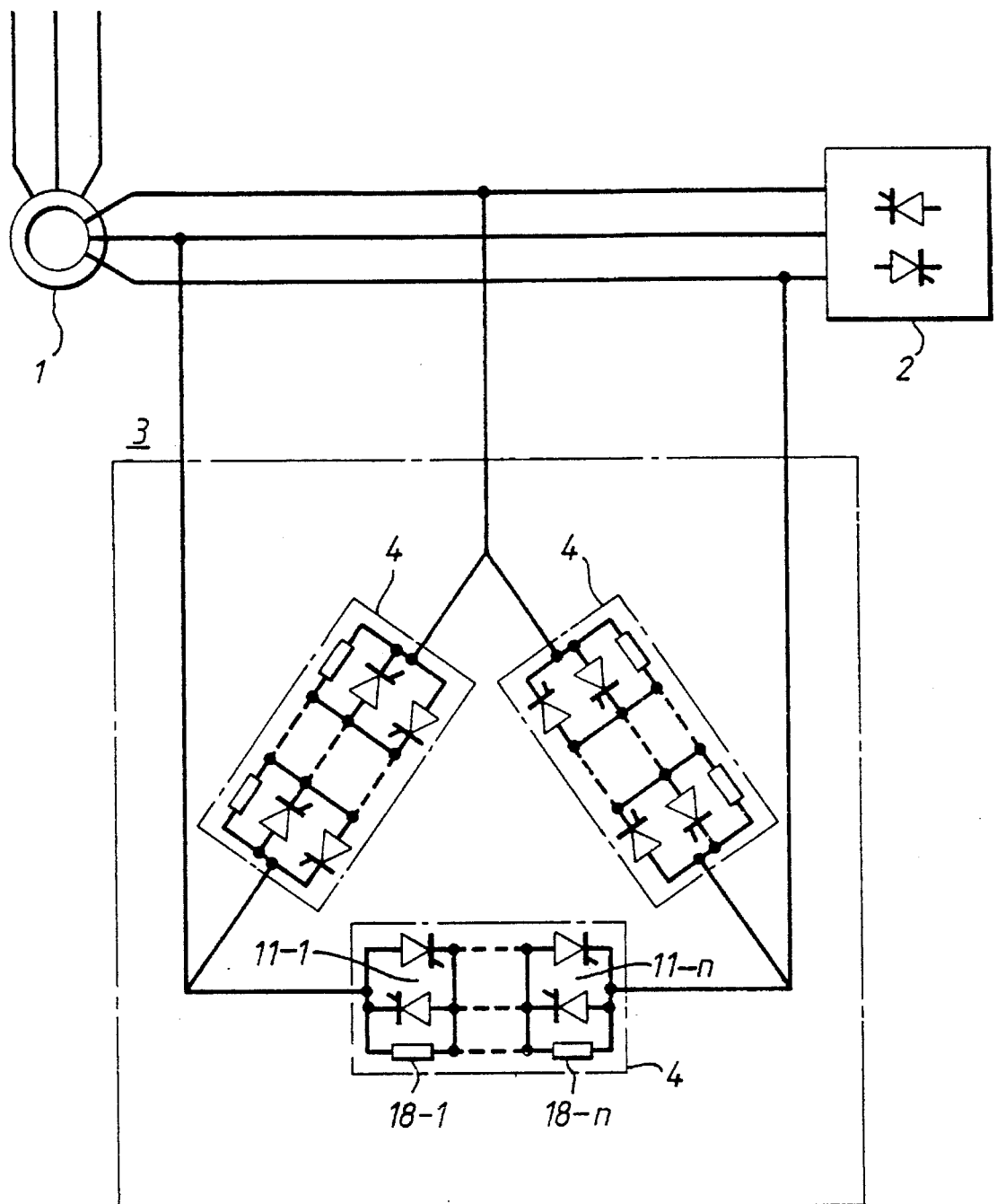
FIG. 5 is a layout diagram showing an overvoltage protection equipment according to a fifth embodiment of this invention.

Such overvoltage protection equipments will be described with reference to the drawings. FIG. 5 shows an overvoltage protection equipment according to a fifth embodiment of this invention. In FIG. 5, 18-1 is an impedance circuit constructed with a series circuit of snubber capacitor 12-1 and snubber resistor 13-1 and voltage grading resistor 14-1 connected in parallel with the series circuit. 18-n is an impedance circuit constructed with a series circuit of snubber capacitor 12-n and snubber resistor 13-n and voltage grading resistor 14-n connected in parallel with the series circuit. In this Figure, the overvoltage protection equipment 3 is constructed with three overvoltage protection circuits 4 shown in FIG. 3, which are connected between each phase of power convertor 2. When overvoltage is generated in the secondary circuit of induction motor 1, the secondary circuit is short-circuited by the overvoltage protection equipment 3 to protect induction motor 1 from overvoltage.

Figure 6:
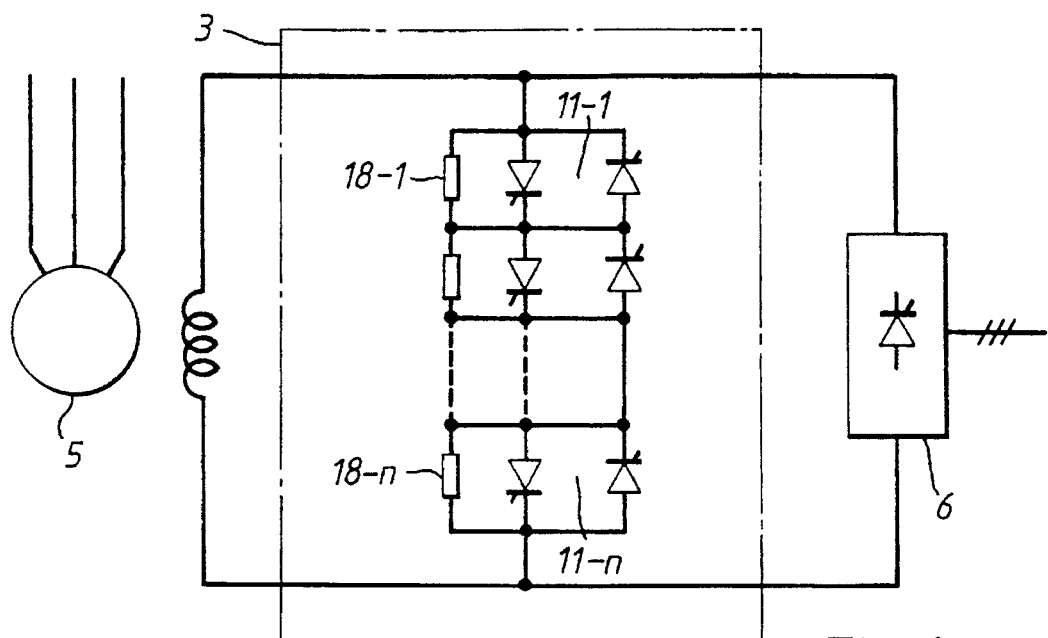
FIG. 6 is a layout diagram showing an overvoltage protection equipment according to a sixth embodiment of this invention.

FIG. 6 shows an overvoltage protection equipment according to a sixth embodiment of this invention. In FIG. 6, 5 is a synchronous motor and 6 is a rectifier that supplies DC power to the field winding of synchronous motor 5. In this Figure the overvoltage protection equipment 3 is constructed with a single overvoltage protection circuit 4 shown in FIG. 3. In this embodiment, when overvoltage is generated in the field winding of synchronous motor 5, the field winding is short-circuited by the overvoltage protection equipment 3 to protect synchronous motor 5 from overvoltage.

In both the embodiments of FIGS. 5 and 6, a proper protection voltage can be selected for the turn-on voltage of the overvoltage protection equipment 3. Accordingly, prevention of the increase in the insulation of induction motor 1 and synchronous motor 5 is realized and the number of series-connected circuit elements in power converter 2 and rectifier 6. Thereby, the size and the production cost of power converter or rectifier 6 can be reduced.

Figure 7:
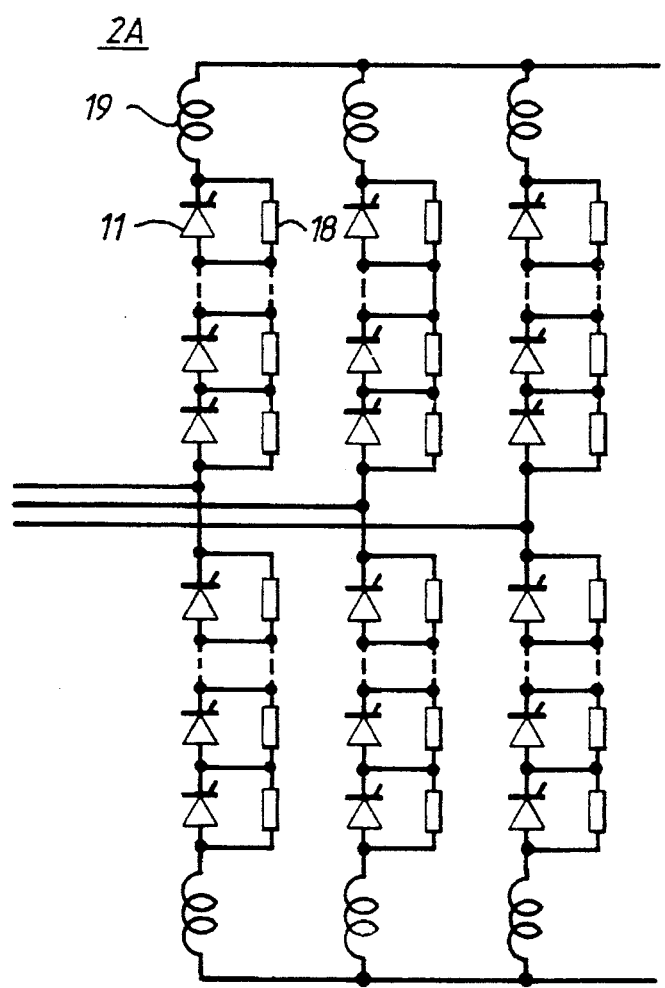
FIG. 7 is a circuit diagram showing,s power converter according to a seventh embodiment of this invention.

FIG. 7 shows a power converter according to a seventh embodiment of this invention. In FIG. 7, 2A is a power converter constructed with VBO-free thyristors. In this Figure, power converter 2A is constructed such that each arm is constructed with a reactor 19 and the overvoltage protection circuit 4 shown in FIG. 1 or FIG. 2, that is, each arm itself has an overvoltage protection function.

Figure 8:
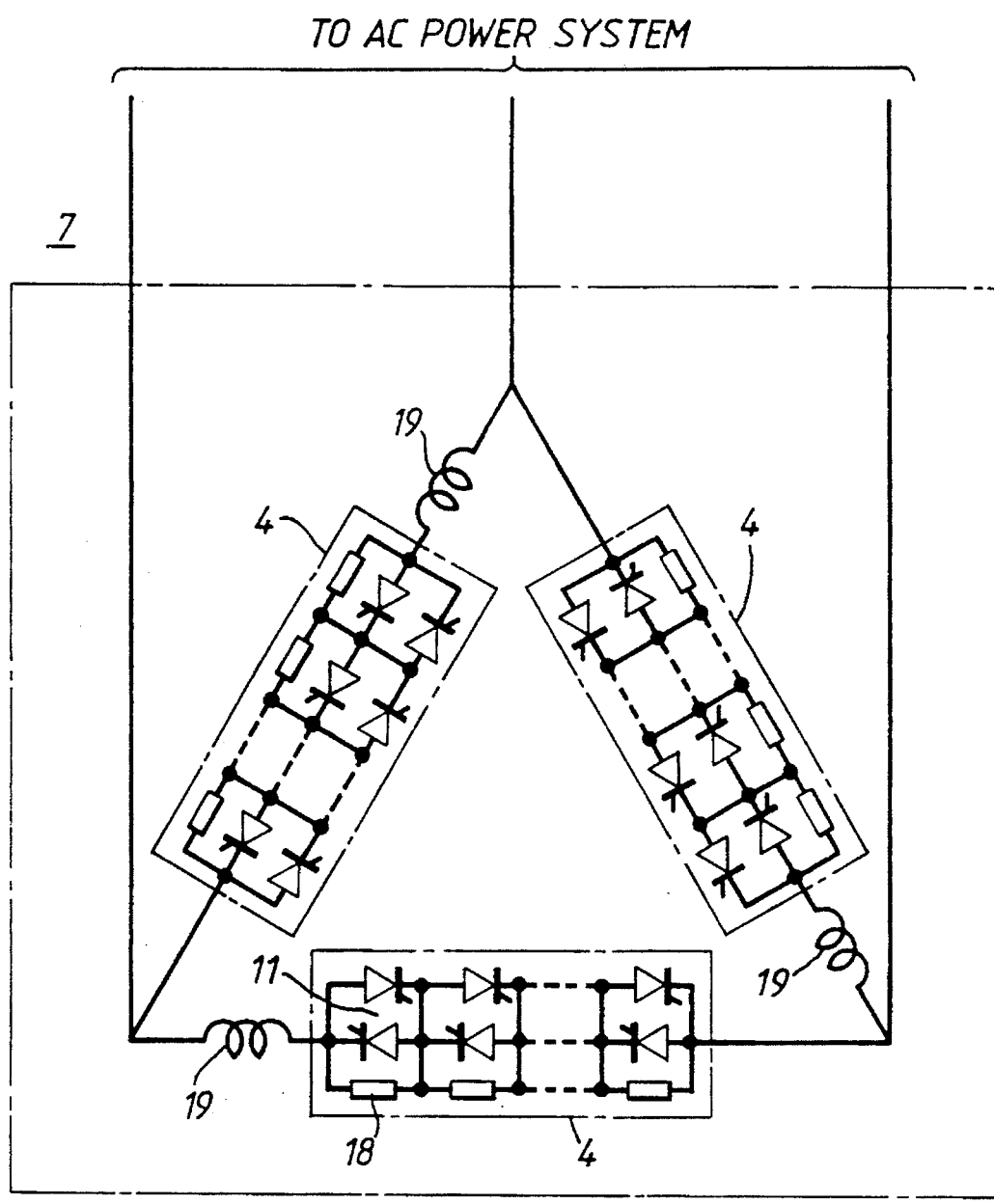
FIG. 8 is a circuit diagram showing a static var compensator according to an eighth embodiment of this invention.
Figure 9:
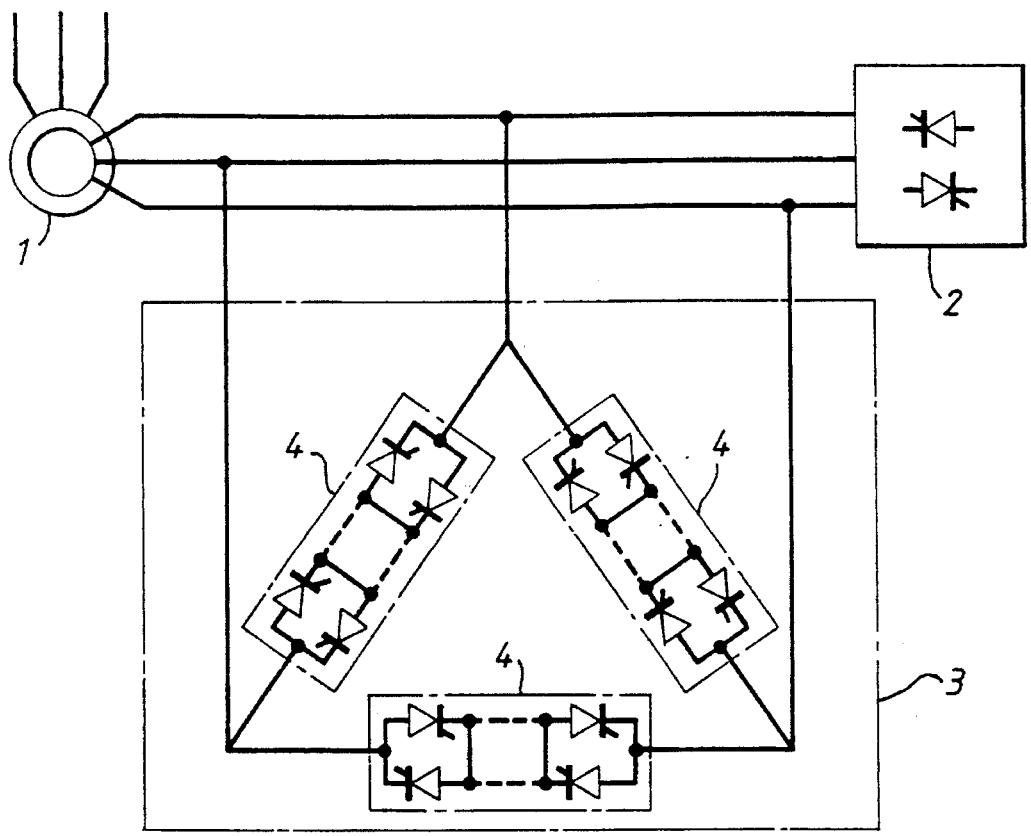
FIG. 9 is a layout diagram showing a conventional overvoltage protection equipment.
Figure 10:
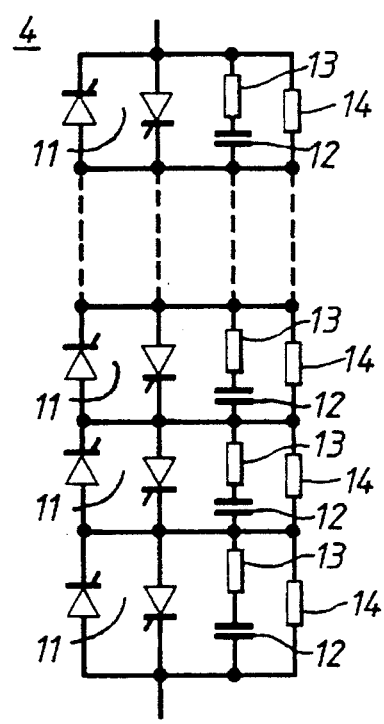
FIG. 10 is a circuit diagram showing a conventional overvoltage protection circuit.

FIG. 8 shows a static var compensator according to an eighth embodiment of this invention. In FIG. 8, 7 is a static var compensator constructed with VBO-free thyristors 11. In this Figure, static var compensator 7 is constructed such that each arm is constructed with reactor 19 and the overvoltage protection circuit 4 shown in FIG. 3 or FIG. 4 and has an overvoltage protection function. The static var compensator 7 is connected to an AC power system to compensate the reactive power.

In FIGS. 7 and 8, an impedance circuit 18 is constructed with a series circuit of snubber capacitor 12 and snubber resistor 13 and voltage grading resistor 14 connected in parallel with the series circuit. Impedance circuit 18 may be constructed with a series circuit of variable-capacitance capacitor 15 and variable resistor 16 and variable resistor 17 connected in parallel with the series circuit.

In these embodiments, the overvoltage protection equipments that were respectively provided in each arm as in a conventional power converter or a conventional static var compensator can be dispensed with. The power converter or the static var compensator according to these embodiments can finely adjust the overvoltage protection actuation level as in the overvoltage protection circuit as described above, and can thereby be reduced in its size and production cost.

It should be noted that the arm constituting the power converter is not restricted to being only an arm in which VBO-free thyristors 11 are connected in series as shown in FIG. 7. A power converter could be constructed with an arm in which there are connected in series a plurality of circuits consisting of VBO-free thyristors in antiparallel connection. Furthermore, the power converter is not restricted to the power converter of FIG. 7. This invention could also be applied to power converters such as power converters for cycloconverters, or chopper circuits etc.

In the above-described embodiments, such case has been described that impedance circuit 18 is constructed with a series circuit of snubber capacitor 12 and snubber resistor 13 and voltage grading resistor 14 connected in parallel with the series circuit. This invention is not, however, limited to those embodiments. Any impedance circuit can be used in this invention, so long as it can change the respective voltage applied to each of the VBO-free thyristors 11 connected in series.

As described above, according to this invention even if an overvoltage protection circuit is constituted by series-connecting n VBO thyristors whose turn-on voltage is VVBO, the turn-on voltage of the overvoltage protection circuit can be made less than n.VVBO.

According to this invention, the overvoltage protection equipment is constructed with the overvoltage protection circuit as described above. So, the insulation of the electrical equipment that is to be protected from overvoltage by the overvoltage protection circuit or equipment of this invention need not be capable of withstanding n.VVBO, making increased insulation of the electrical equipment unnecessary. Also, the electrical equipment need not to increase its construction devices and elements. Thereby, this invention can reduce the size and production cost of the electrical equipment to be protected from overvoltage.

In the power converter or the static var compensator according to this invention, the arm itself has an overvoltage protection function wherein the overvoltage protection actuation level can be finely adjusted. So, a power converter or a static var compensator can be provided wherein overvoltage protection circuits provided in each arm can be dispensed with, and can thereby reduce its size and production cost.

Obviously, numerous modification and variations of the present invention are possible in light of the above teachings. It is therefore to be understood that within the scope of the appended claims, the invention may be practiced otherwise than as specifically described herein.

What is claimed is:

1. An overvoltage protection circuit, comprising:
   a plurality of series connected thyristor means having an overvoltage protection function;
   a plurality of impedance means, each being connected in parallel with one of said thyristor means, respectively; and
   said plurality of impedance means including at least a first impedance means and at least a second impedance means, wherein said first impedance means comprising a first impedance circuit having a first impedance value and said second impedance means comprising a second impedance circuit.

2. The overvoltage protection circuit according to claim 1, wherein:
   each of said plurality of impedance means includes a series circuit of a snubber capacitor and a snubber resistor and a voltage grading resistor connected in parallel with said series circuit.

3. The overvoltage protection circuit according to claim 1, wherein:
   said plurality of impedance means includes at least one impedance means comprising a variable impedance circuit.

4. The overvoltage protection circuit according to claim 1, wherein:
   each of said plurality of thyristor means includes a VBO-free thyristor.

5. The overvoltage protection circuit according to claim 1, wherein:
   each of said plurality of thyristor means includes an anti-parallel circuit of two VBO-free thyristors having a second impedance value, said first impedance value being different from said second impedance value;
   wherein the turn-on voltage of said overvoltage protection circuit is finely adjusted based upon the values of said plurality of impedance means.

6. An overvoltage protection equipment for protecting an electric equipment from overvoltage, comprising;
   three overvoltage protection circuits connected between respective two phases of said electric equipment;
   each of said three overvoltage protection circuit, including a plurality of series connected thyristor means having an overvoltage protection function, and a plurality of impedance means, each being connected in parallel with one of said thyristor means, respectively, and
   said plurality of impedance means comprising at least a first impedance means and at least a second impedance means, wherein said first impedance means comprising a first impedance circuit having a first impedance value and said second impedance means comprising a second impedance circuit having a second impedance value, said first impedance value being different from said second impedance value;
   wherein the turn-on voltage of said overvoltage protection circuit is finely adjusted based upon the values of said plurality of impedance means.

7. The overvoltage protection equipment according to claim 6, wherein: each of said plurality of thyristor means includes an anti-parallel circuit of two VBO-free thyristors.

8. An overvoltage protection equipment for protecting a synchronous motor and a rectifier for supplying DC power to a field circuit of said synchronous motor from overvoltage, comprising:
   an overvoltage protection circuit connected between said synchronous motor and said rectifier;
   said overvoltage protection circuit including a plurality of series connected thyristor means having an overvoltage protection function, and a plurality of impedance means, each being connected in parallel with one of said thyristor means, respectively, and said plurality of impedance means comprising at least a first impedance means and at least a second impedance means, wherein said first impedance means comprising a first impedance circuit having a first impedance value and said second impedance means comprising a second impedance circuit having a second impedance value, said first impedance value being different from said second impedance value;

wherein the turn-on voltage of said overvoltage protection circuit is finely adjusted based upon the values of said plurality of impedance means.

9. The overvoltage protection equipment according to claim 8, wherein:

each of said plurality of thyristor means includes an antiparallel circuit of two VBO-free thyristors.

10. A power converter, comprising:

a plurality of bridge connected arm circuits;

each of said arm circuits including a series circuit of a reactor and an overvoltage protection circuit;

said overvoltage protection circuit including a plurality of series connected thyristor means having an overvoltage protection function, and a plurality of impedance means, each being connected in parallel with one of said thyristor means, respectively, and said plurality of impedance means comprising at least a first impedance means and at least a second impedance means, wherein said first impedance means comprising a first impedance circuit having a first impedance value and said second impedance means comprising a second impedance circuit having a second impedance value, said first impedance value being different from said second impedance value;

wherein the turn-on voltage of said overvoltage protection circuit is finely adjusted based upon the values of said plurality of impedance means.

11. The power converter according to claim 10, wherein:

each of said plurality of thyristor means includes an anti-parallel circuit of two VBO-free thyristors.

12. A static var compensator, comprising:

delta connected three arm circuits connected between respective two phases of a power system;

each of said arm circuits including a series circuit of a reactor and an overvoltage protection circuit;

said overvoltage protection circuit including a plurality of series connected thyristor means having an overvoltage protection function, and a plurality of impedance means, each being connected in parallel with one of said thyristor means, respectively, and said plurality of impedance means comprising at least a first impedance means and at least a second impedance means, wherein said first impedance means comprising a first impedance circuit having a first impedance value and said second impedance means comprising a second impedance circuit having a second impedance value, said first impedance value being different from said second impedance value; wherein the turn-on voltage of said overvoltage protection circuit is finely adjusted based upon the values of said plurality of impedance means.

13. The static var compensator according to claim 12, wherein:

each of said plurality of thyristor means includes an anti-parallel circuit of two VBO-free thyristors.

* * * * *